(No Model.)
W. M. CLOW.
DEVICE FOR FORMING OPENINGS IN WIRE FENCES.
No. 315,599. Patented Apr. 14, 1885.
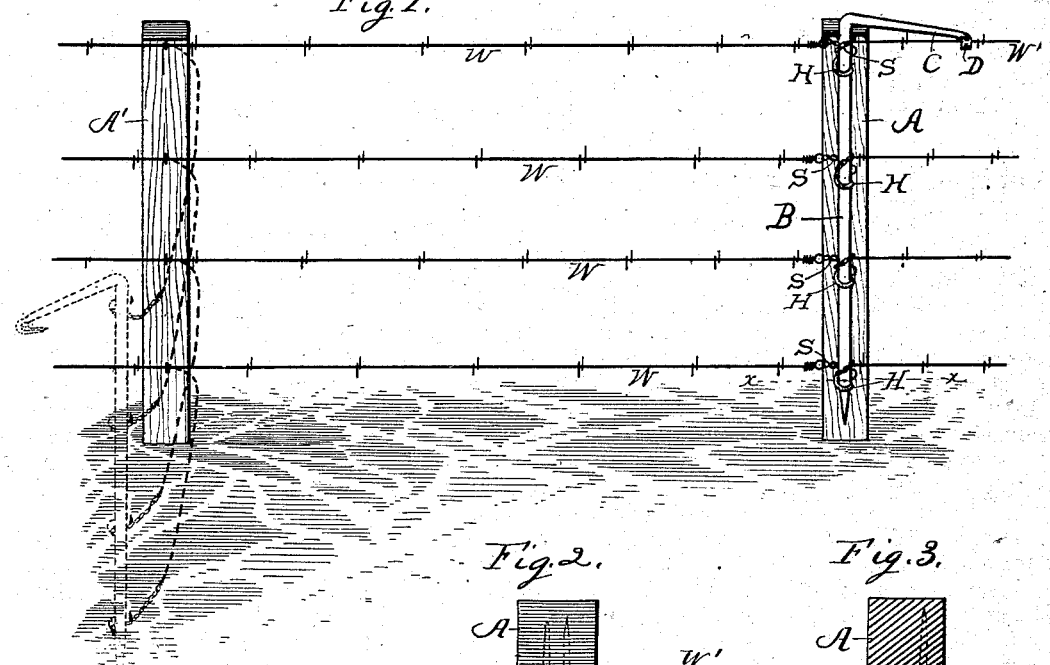
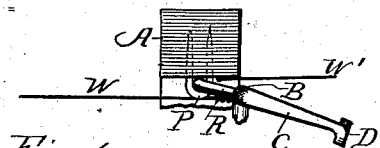
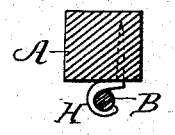
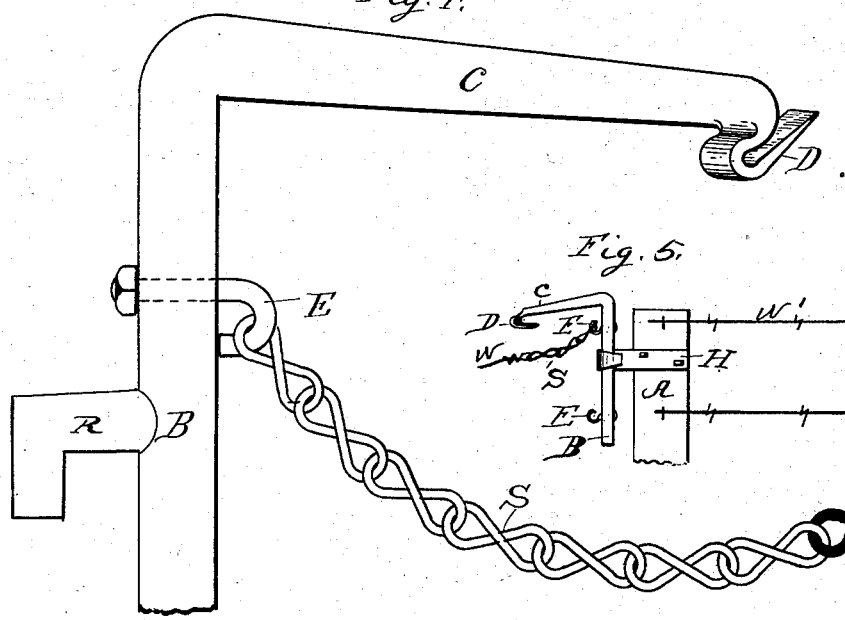
Witnesses.
Thos. H. Hutchins.
Wm. J. Hutchins.
Inventor
William M. Clow.

UNITED STATES PATENT OFFICE.

WILLIAM M. CLOW, OF WILL COUNTY, ILLINOIS.

DEVICE FOR FORMING OPENINGS IN WIRE FENCES.

SPECIFICATION forming part of Letters Patent No. 315,599, dated April 14, 1885.

Application filed July 11, 1884. (No model.)

*To all whom it may concern:*

Be it known that I, WILLIAM M. CLOW, a citizen of the United States of America, residing in the county of Will and State of Illinois, have invented certain new and useful Improvements in Devices for Forming Openings in Wire Fences, of which the following is a specification, reference being had therein to the accompanying drawings.

Figure 1 is a perspective view showing a little more than a panel of wire fence having the device applied, the dotted lines showing the fence-panel open to form a passage-way through the fence; Fig. 2, a plan view on the top of a post, showing the bar B attached to it by means of the integral arms R and staple P; Fig. 3, a horizontal sectional view through the post A and rod B on line $x$, Fig. 1, looking downward; Fig. 4, a perspective view of the upper end of the bar or rod B, showing it bent to form the arm C and hook D, for rotating the rod B, and for hooking it to a wire of the fence after it has been rotated to hold it in place, and also showing the means for attaching the fence-wires W to it by means of the hook E and chain S; and Fig. 5 is a side view of the upper end of a post, A, and the rod B and the hinge H, by which they are connected.

This invention consists in the device hereinafter described, by the use of which an opening or passage-way may be made through a wire fence at any place along its length for convenience in passing from one field to another without having to erect a gate in the fence, and also for tightening up or loosening the fence-wires when desired.

Referring to the drawings, A and A' represent the ordinary posts of a fence, to which the wires W W' are attached.

When it is desired to form an opening through the fence, a bar, B, is attached to the side of post A by means of the hooks H, forming hinges, or by staples, as shown, in such manner that the bar B is detachable and can be rotated to wind up on it the chains S, which connect the cut-off ends of the wires W with said bar B by means of the hooks E. When the wires are cut, the cut-off ends are attached to the said chains, as shown in Fig. 4, or by any suitable means, so that instead of winding up the wires themselves on the bar B the chain is wound thereon, for the reason that the chain is more flexible and will not break as readily as the wire, and also that the chain furnishes means by which the length of the wires between posts A and A' may be regulated by hooking any link into the hook E, so that when the bar B rotates to wind up the chain the tension on all the wires will be uniform, so one will not be left slack while others are taut. The bar B terminates at its upper end in the crank-arm C, having a hook, D, on its outer end to hook on the upper fence-wire, as shown in Fig. 1, to prevent rotation backward of said rod after it has wound up all the chains and wires, as shown in said figure. The upper end of said bar and crank-arm C are intended to extend above the post A, so they can rotate over the top of said post and be rotated as much as may be desired to give proper tension to the fence-wires. The hinges H are constructed in the form shown in Figs. 3 and 5, so that the bar B can be removed therefrom when the wires W are slack and when it is desired to open the panel of fence, as shown by the dotted lines in Fig. 1. The lower end of the bar B is pointed, so that when the panel is sufficiently open it can be driven into the ground, as shown in said figure by the dotted lines, to hold it upright when detached from post A, and to prevent the wires from becoming tangled. The hinges H are formed and placed on the post A in such manner that the bar B will stand a little distance from it, so that there will be room to wind the chain C on it without interference of the post. The rod B may be provided with integral extending arms R, having their outer ends turned down to hook into the staple P for a hinge, as shown in Figs. 2 and 4. In such case the wires W may be attached directly to said bar, leaving out the chains C, and receive their tension by swinging the bar backward by means of the arm C, the same as in the other case, if desired. The result accomplished would be the same, and the bar B could be removed from the staple-hinge P simply by raising it up out of said staple.

The method of using this device is as follows: The wires W are cut off next the post A, and the panel-wires are attached to the chains C, as shown, and the chains attached to the hooks E on the rotating bar B, as shown in Fig. 4 particularly. The bar B is then placed in the hook-hinges H, which have been previously driven in or attached to said post. The bar B is then ready to be rotated by means of the arm C acting like a crank until the wires are stretched up taut, as shown in Fig. 1. The hook D is then hooked behind the upper wire to hold the rod B from unwinding.

When it is desired to open the panel, the hook D is released from the upper wire and the bar B unwound until the wires are slackened, so that the bar can be removed from its hinges and placed in the position shown by the dotted lines in Fig. 1, thus forming a passage-way through the fence.

Having thus described my invention, what I claim as new, and desire to secure by Letters Patent, is as follows, to wit:

1. The combination of the fence-post A, having the hinge-hooks H, with the rotating bar B, having the arm C, terminating in the hook D, the fence-wires W, and hooks E, as and for the purpose set forth.

2. In a wire fence, the rotating bar B, having the hooks E, and arm C, terminating in the hook D, and arranged to be detachably connected to the fence-post A, in combination with the fence-wires W, as and for the purpose set forth.

WILLIAM M. CLOW.

Witnesses:
ROBERT CLOW,
WM. J. HUTCHINS.